Nov. 1, 1966  W. L. SHEPPARD  3,282,288
PRESSURE-RESPONSIVE CONTROL VALVE
Filed July 3, 1961  3 Sheets-Sheet 2
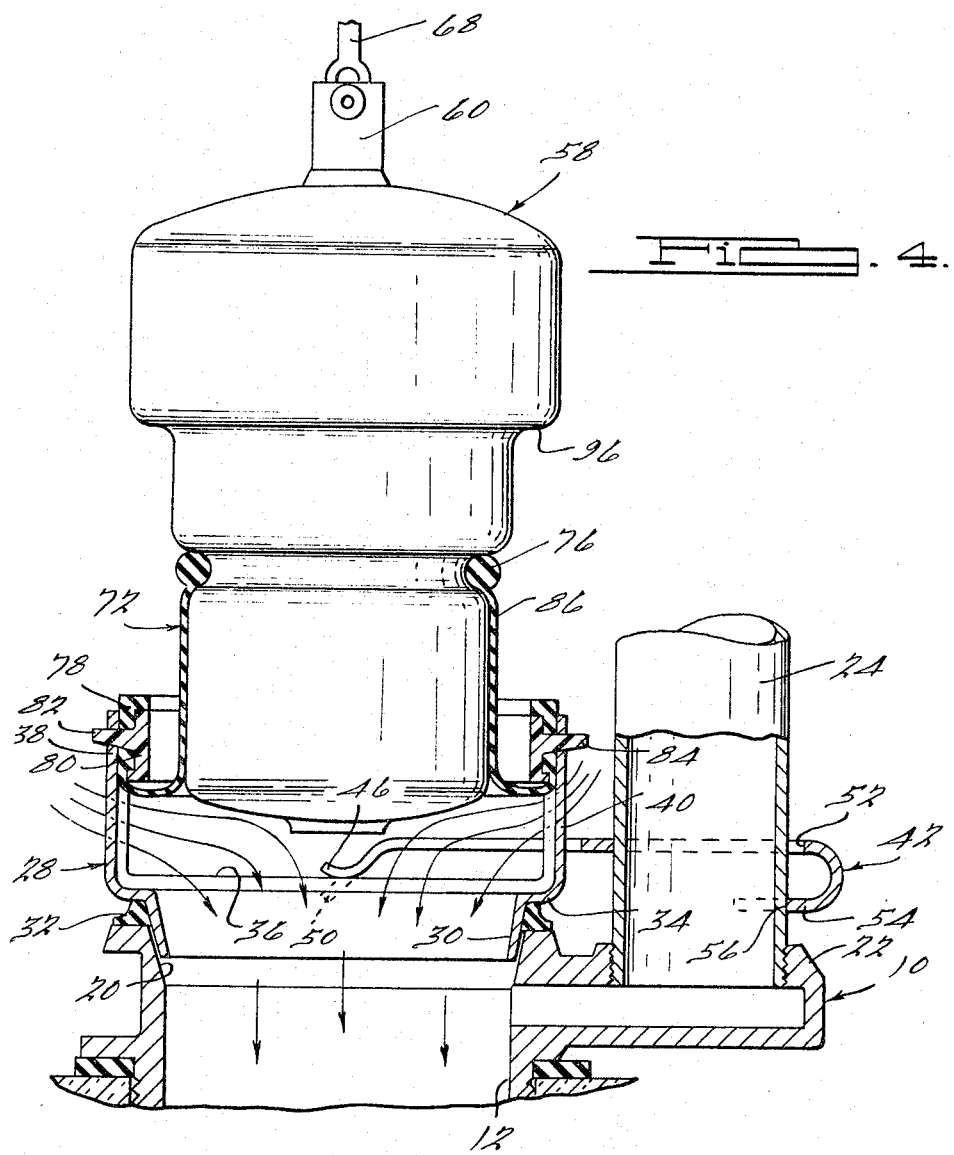
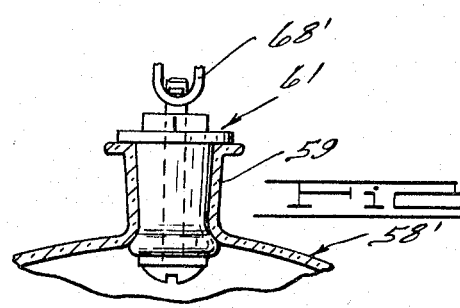
INVENTOR.
William L. Sheppard
BY
Harness, Dickey & Pierce
ATTORNEYS Nov. 1, 1966  W. L. SHEPPARD  3,282,288
PRESSURE-RESPONSIVE CONTROL VALVE
Filed July 3, 1961  3 Sheets-Sheet 3

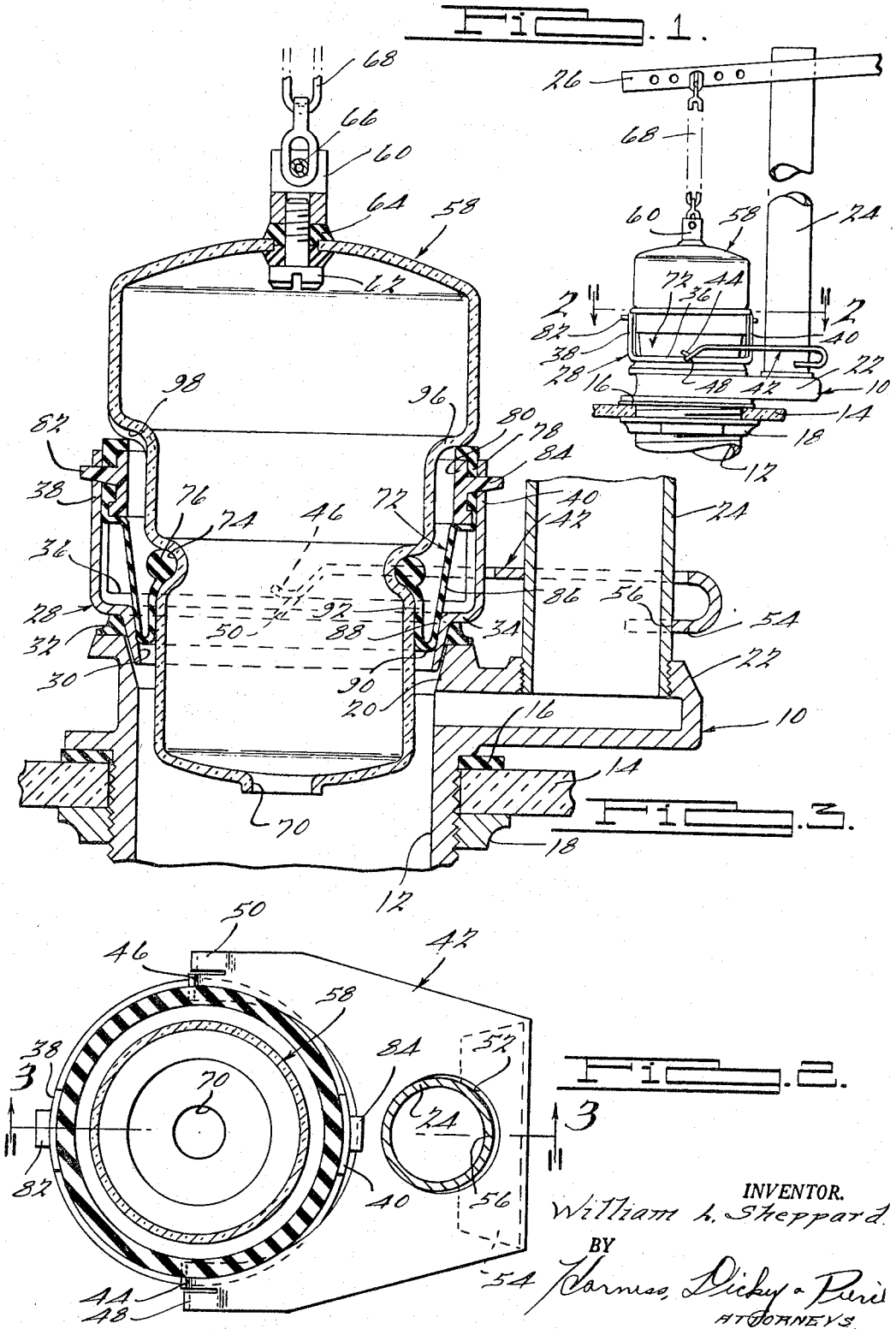

INVENTOR.
William L. Sheppard
BY
Harness, Dickey & Pierce
ATTORNEYS.

United States Patent Office 3,282,288
Patented Nov. 1, 1966

3,282,288
PRESSURE-RESPONSIVE CONTROL VALVE
William L. Sheppard, Romulus, Mich., assignor of one-half to Edwin J. Lukas, Dearborn, Mich.
Filed July 3, 1961, Ser. No. 121,438
24 Claims. (Cl. 137—315)

This invention relates to valves and more particularly to fluid flow and pressure controlling valves, and the principles of the present invention are applicable to a variety of types of valves including hydraulic or pneumatic flow control and pressure controlling or regulating valves.

An object of this invention is to establish an improved seal between a valve and a valve seat.

Another object of this invention is to establish an improved mode of engagement between a valve and a valve seat by utilizing a flexible valve element and rolling successive increments of that valve successively into engagement with corresponding increments of the valve seat, so as progressively to increase the area of engagement between the valve and the valve seat.

Another object of this invention is to improve the sealing relationship between a valve and a valve seat despite the presence of surface discontinuities on the valve seat by providing a flexible valve element which will conform to the discontinuities.

Another object of this invention is to improve the guiding of a ball valve assembly during its axial movement toward a valve seat.

Another object of this invention is to provide an improved replacement valve seat and to facilitate its installation.

Another object of this invention is to simplify the installation of a replacement valve assembly.

Another object of this invention is to improve the balancing of a regulating valve to achieve improved uniformity of output pressure despite variations of input pressure.

The manner of accomplishing the foregoing objects, and other objects and features of the invention, will be apparent from the following detailed description of embodiments of the invention when read with reference to the accompanying drawings in which:

FIGURE 1 is a side elevational view of a valve embodying certain of the principles of the present invention, shown in association with certain environmental elements;

FIGURE 2 is a horizontal sectional view taken substantially along the line 2—2 of FIGURE 1;

FIGURE 3 is a vertical sectional view taken substantially along the line 3—3 of FIGURE 2 and showing elements of the assembly in one relationship;

FIGURE 4 is a view corresponding to that of FIGURE 3 but with the elements shown in different relationship;

FIGURE 5 is a fragmentary sectional view of a modified sealing means;

Figure 6:
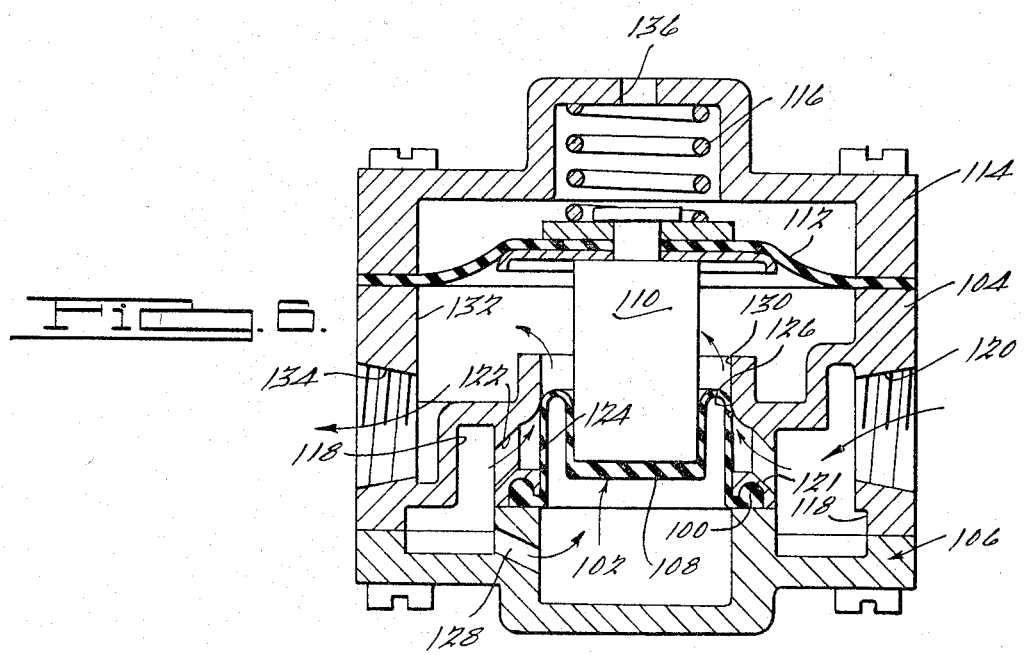
FIGURE 6 is a longitudinal sectional view of a modified form of valve embodying certain of the principles of the present invention.

In the arrangement illustrated in FIGURES 1 through 4 of the drawings, certain of the principles of the present invention have been illustratively embodied in a closet-tank flush valve assembly. In the conventional closet tank, the flush valve assembly comprises a valve base 10 (FIGURES 1 and 2) having an out-flow pipe 12 which projects downwardly through a hole formed in the bottom 14 of the tank, with a gasket 16 normally being disposed between the under-surface of valve base 10 and the upper surface of the tank bottom 14 and with the unit being retained in place by means of a nut 18 threaded upon the pipe 12 and engaging the under-surface of the tank bottom 14. The pipe 12 is conventionally connected to the bowl by a fitting (not shown) connected to the pipe 12.

The conventional valve base 10 includes a valve seat 20 (FIGURE 3) formed integrally therewith and coaxially with the pipe 12 and defining a fluid out-flow port. The valve base also normally includes a laterally projecting cored boss 22 provided with a threaded aperture to accept an upwardly projecting overflow pipe 24. Conventional units also normally include a trip lever 26 pivotally mounted with respect to the tank and actuated by a flush handle (not shown).

In the customary practice, a ball, serving as a float and a valve, flexibly linked to the trip lever 26, is guided for axial movement toward and from the valve base 10 by an assembly comprising a guide supported upon the tube 24 and a pair of lift wires (not shown). In some cases additional guiding means are employed and in at least one arrangement the ball valve is guided in a tube supported coaxially with the valve seat 20.

Each of these types of conventional units, as well as others, may be adapted for improved operation in accordance with the principles of the present invention. Preparatory to that adaptation, in the representatively illustrated arrangement, the existing guide means, the existing ball and the flexible link between the ball and the trip lever 26 are removed and discarded.

In the arrangement illustrated in FIGURES 1 through 4, a generally tubular outer or valve seat member 28 is secured upon the valve base 10. The outer member 28 includes a portion 30 the interior surface of which, as will be seen, serves as a valve seat and the exterior surface of which fits within the existing valve seat 20. A fluid seal 32 is trapped between the upper surface of the existing valve base 10, adjacent the existing valve seat 20, and a radially projecting portion 34 of the outer member 28. The radially projecting portion 34 is provided with a narrow upstanding lip 36 around a substantial portion of its periphery and is further provided, at two diametrically opposed points, with a pair of upstanding arms 38 and 40.

With the unit adapted for replacement use, as illustrated, the outer member 28 should be secured in fixed position with respect to the valve base 10, by means of a clamp 42, and this is accomplished in the preferred arrangement. As may best be seen in FIGURE 2 of the drawings, clamp 42 is essentially bifurcated in the manner of a spanner so as to clear the diameter of the lip 36 except at two diametrically opposed points. At these points, clamp fingers 44 and 46 engage the peripheral lip 36 on the outer member 28, and a pair of guide fingers or guide tabs 48 and 50, disposed radially outwardly of the fingers 44, and 46, are positioned to engage or by alternatively engageable with the sides of the peripheral lip 36 so as to locate and position the clamp fingers 44 and 46.

Clamp 42 is further provided with an aperture 52 which accepts and slides over the over-flow pipe 24. If desired, the aperture 52 can be about the same diameter as the diameter of the pipe 24, which would permit the clamp to be locked to the over-flow tube 24 by jamming its apertured end downwardly after the fingers 44 and 46 have engaged the peripheral lip 36 so as to tend to cock the clamping member into locked position. However, it has been found that over-flow pipes 24 which have been in use tend to be sufficiently corroded that it is difficult to asemble a clamp thereto having an aperture of the same size as the diameter of the pipe, and accordingly the aperture 52 is preferably made appreciably larger than the over-flow pipe so as to be freely insertable thereover. In the illustrated arrangement, the radius of aperture 52 is made about equal (such as ½ inch) to that of tube 24 over approximately 120°, and is made somewhat larger (e.g. 1/32 inch larger) over the remainder, with the latter arc being taken about a slightly different center (e.g., about a center spaced 1/16 inch outwardly from the first center). The clamp 42 is then provided with a reversed tongue portion 54 provided with a partial aperture 56. The aperture 56 could be a full aperture, but the illustrated arrangement works satisfactorily. If the horizontal distance between the right hand edge (in the illustrated view) of the aperture 56 and the left hand edge of the aperture 52 is made approximately equal to the outer diameter of the over-flow pipe 24, then the clamp 42 will, when clamped, lie approximately horizontally as illustrated. Again the clamp 42 is locked to the tube 24 by depressing its right hand or apertured end after the fingers 44 and 46 are brought into bearing engagement with the peripheral lip 36.

Both the outer member 28 and the clamp 42 are desirably made of relatively non-corrodible materials, and in a constructed embodiment of the invention, they were formed of brass.

While the unit illustrated in FIGURES 1 through 4 is designed as a replacement for existing ball valve units, it will be appreciated that for original equipment use, the outer member 34 may be formed integrally with the valve base 10 which would obviate the necessity for the provision of the seal 32 and for clamping means such as clamp 42.

An inner member 58 is coaxially disposed within the outer member 28 and is movable axially with respect thereto. The inner member 58 serves or may serve as a piston member and, in addition, in the utilization illustrated in FIGURES 1 through 4 serves as a float. Accordingly, inner member 58 is formed so as to be buoyant in the fluid, which in the case of a closet tank flush valve would be a liquid, water. Inner member 58 is preferably relatively rigid, adequately impervious to the fluid, relatively uncorrodible in the fluid, and of adequate weight to insure proper gravity operation of the unit, as will be described, and while other materials may well be employed, glass has been found to be a satisfactory material.

A clevis 60 is secured to the upper central protion of the inner member 58 by being screwed upon a clevis screw 62 which is inserted through an aperture in the upper end of the inner member 58, with fluid sealing means 64 being inserted therebetween to prevent the entrance of water into the hollow inner member 58 at this point. A clevis pin 66, such as a rivet, is inserted through the clevis 60 and engages a chain 68 or other flexible linkage the other end of which is connected to the trip lever 26.

It will be observed that an aperture 70 is provided in the lower end of the inner member 58 to permit any water which leaks by the sealing means 64 to become discharged from the member 58. If there is no leakage, this aperture may be omitted.

If desired, other means for attaching the clevis 60 to the inner member 58 may be employed. For example, as is illustrated in FIGURE 5, the inner member 58 may be provided with a neck 59 and a stopper-screw-clevis nut assembly 61 may be utilized to compress the resilient stopper longitudinally so as to expand the stopper radially into intimate sealing engagement with the neck 59.

A flexible diaphragm 72 (FIGURE 3) is disposed between and is secured to the outer member 28 and the inner member 58. This diaphragm may serve purely as a centering means for inner member 58, if the inner member 58 serves directly as or carries the valve, but in the illustrated arrangement, diaphragm 72 serves not only as a centering means but also as the valve-seat-engaging element. Accordingly, the inner member 58 in the region of the valve seat 30 is smaller in diameter than that of the valve seat 30 so as to define a gap therebetwen accepting a portion of diaphragm 72.

Inner member 58 is provided with a circumferential groove or indentation 74 to accept an enlarged bead 76, at the central portion of the diaphragm 72, with the free diameter of the bead 76 preferably being smaller than the diameter of the groove 74 so as to insure a tight and sealing engagement therebetween.

The outer peripheral portion 78 of the diaphragm 72 is fixed with respect to the valve seat 30 as by being secured to the upstanding arms 38 and 40 of the outer member 28. In the illustrated arrangement, this is accomplished through the medium of a diaphragm retaining ring 80 which tightly seats within the somewhat thicker upper portion 78 of the diaphragm 72. The retaining ring 80 is provided with a pair of diametrically opposed tangs 82 and 84 which pass through correspondingly shaped slots in the outer peripheral portion 78 of the diaphragm 72 and through a pair of correspondingly shaped slots formed in the upstanding arm portions 38 and 40 of the outer member 28. Retaining ring 80 is desirably sufficiently rigid to retain the outer peripheral portion 78 of the diaphragm 72 stretched into a circular configuration, while yet being sufficiently resilient that it may be distorted elliptically so as to permit the insertion of the tangs 82 and 84 through the apertures in the upstanding arms 38 and 40. While other materials may be employed, in a constructed embodiment ring 80 was formed of nylon.

The generally cylindrical, conical or conoidal section of the diaphragm 72 between the portion 78 and the bead 76 is folded upon itself to define (in the position of the apparatus illustrated in FIGURE 3 of the drawings) a depending curtain portion 86, and an intermediate portion including a sealing portion 88 engaging the valve seat 30, a lobe and sealing portion 90 extending across the gap between the inner member 58 and the outer member 28, and a portion 92 extending between the lobe 90 and the bead 76 and lying against the side of the inner member 58. The diaphragm 86 should be elastic to permit the lobe portion 90 to travel as the inner member 58 is moved relative to the outer member 28 and an artificial or natural rubber is indicated. In a constructed arrangement, the diaphragm was made of 30-durometer neoprene In the application of certain of the principles of the invention illustrated in FIGURES 1 through 4, it is assumed that the assembly is submersible in the liquid, and when the apparatus is submerged while in its FIGURE 3 position, water fills the volume between inner member 58 and diaphragm 72. While an enlarged diameter shoulder portion 96 formed on the inner member 58 rests against the upper surface of the portion 78 of the diaphragm 72, to serve as a limit stop to the downward movement of the inner member 58, that point of engagement does not serve as a liquid seal. If desired, a discontinuity may be formed on the exterior of the portion 96 to insure that a water channel is established, as is illustrated by the flute 98 in FIGURE 3 of the drawings.

The water pressure is exerted against the inner surface of the curtain portion 86 of the diaphragm 72, against the inner surface of the sealing portion 88 of the diaphragm 72, against the inner surface of the lobe portion 90 of the diaphragm, against the inner surface of the depending portion 92 of the diaphragm 72 and against the bead 76. Since the outer face of the curtain portion 86 of the diaphragm 72 is exposed to the fluid pressure, the fluid-pressure forces against this section are balanced and there is no effective deflection of the portion 86 from its illustrated position. Since the seal portion 88 of the diaphragm 72 engages the valve seat 30, there is no water presssure applied against the outer or sealing surface thereof and accordingly the entire pressure of the water exerts a force tending to press the portion 88 into intimate area engagement with the valve seat 30. Similarly, the water pressure exerts a force tending to hold the bead 76 tightly engaged in the groove 74 in the inner member 58 and tends to force the portion 92 into sealing engagement with the wall of the inner member 58 to prevent any leakage between the diaphragm and the inner member 58. Since the volume below the inner member 58 and within the pipe 12 is filled with air normally at or effectively at atmospheric pressure, a fluid pressure differential exists across the lobe portion 90 of the diaphragm 72 tending to keep the lobe portion 90 in its illustrated position.

It will be observed that while the inner member 58 is buoyant, it is held in the position illustrated in FIGURE 3 under these conditions due to the water pressure acting upon the effective areas of the diaphragm 72 and of the inner member 58, since the area below that diaphragm and inner member is essentially at atmospheric pressure. For example, in a constructed embodiment, the float assembly weighed about 0.23 pound, the total floatation was about 0.5 pound, and the water pressure was exerted upon an effective area of about 3.55 square inches. With an assumed level of water in the tank to produce ¼ pound per square inch water pressure, the resultant downward force was about 1½ pounds.

Flushing is initiated by actuating the trip lever 26 to exert an upward force upon the inner member 58 via the chain 68. As a result, the inner member 58 is moved effectively axially with respect to the valve seat 30, and the intermediate section of diaphragm 72 rolls upon itself so that the lobe 90 effectively travels upwardly at a lower velocity than that of the inner member 58 and so that the seal portion 88 of the diaphragm 72 is effectively unrolled or peeled from the valve seat 30. As soon as the lobe 90 has moved upwardly adequately to permit substantial fluid flow through the valve seat 30, the inner member 58 is free to rise toward the surface, due to its own buoyancy, to a position such as illustrated in FIGURE 4 of the drawings. In the illustrated arrangement, it is the flexible diaphragm 72 which limits the upward movement of the inner member 58 relative to the outer member 28.

With the inner member 58 in the position illustrated in FIGURE 4 of the drawings, the water in the tank flows primarily radially inwardly through a circumferential area defined at the lower edge by the lip 36 and at the upper edge by the under-surface of the diaphragm 72. This circumferential area serves as the fluid in-flow port for the valve. The water then turns downwardly and passes through the fluid output port for the valve, defined by the valve seat 30, and then through the pipe 12. By virtue of this change of direction in the flow of the liquid, a reactive force is exerted upon the under-surface of the diaphragm 72 and inner member 58 tending to maintain the inner member 58 in the position illustrated in FIGURE 4 even though the water level in the tank commences to drop due to the outflow.

It may be observed that with the chain 68 released at this time, as it normally is, a portion of that chain may lie against the upper surface of the inner member 58 and eccentrically load that inner member to cause it to tend to cock or tilt. However, in view of the self-centering action of the diaphragm 72, this tilting, if it occurs, does not in any way interfere with the proper operation of the unit.

The unit will tend to remain in this condition until the water level in the tank lowers to the point at which the inner member 58 drops downwardly due to its own weight. During this downward travel, the diaphragm 72 again rolls upon itself and, in the process, develops radially exerted forces distributed around the periphery of the inner member 58 tending to center inner member 58 with respect to the valve seat 30. The diaphragm progressively peels from the lower portion of the inner member 58 and each increment of a portion of the length of the diaphragm travels through the lobe during the rolling movement. After the diaphragm first contacts the upper edge of the valve seat 30, successive increments of that diaphragm are rolled successively into engagement with corresponding increments of the valve seat to progressively increase the area of engagement between the valve and the valve seat, that is, the valve is unfolded into progressive engagement with the valve seat. It will be observed that there is no slipping or skidding movement between the diaphragm and the valve seat. If there is a small protuberance upon the surface of the valve seat 30, such as sediment or corrosion the diaphragm will simply roll over that protuberance and will seal around it due to the resiliency of the flexible material.

At this time, there is primarily but a mechanical seal between the diaphragm 72 and the valve seat 30. This seal, however, is effective because the lobe 90 (FIGURE 3) is trapped between member 58 and valve seat 30 and forces resulting from the resiliency and elasticity of the diaphragm assist to maintain the sealing area 88 of the diaphragm 72 against the valve seat 30.

Water now flows into the tank, and when the level rises above the line of engagement between shoulder 96 on the inner member 58 and the upper edge of the portion 78 of the diaphragm 72, water will flow into the cavity between the diaphragm 72 and the inner member 58 and thereafter will exert a progressively increasing pressure, as the water level rises, tending to maintain the bead 76 and the depending portion 92 of the diaphragm 72 in sealing engagement with the inner member 58, and tending to force the sealing area 88 of the diaphragm 72 into tight sealing engagement with the valve seat 30.

While the sizes and shapes of elements may be changed, it is desirable that lobe 90 be in a position, when the valve is closed (FIGURE 3), such as a circumferential area of substantial width upon the diaphragm 72 engages a circumferential area of substantial width on the valve seat 30 so that there is area, rather than line, engagement, and so that there is sealing in depth.

It will be observed that the illustrated valve seat 30 is slightly conical. This is not essential to the practice of the sealing concept which are the subject of this invention and the valve seat 30 could be of other forms. It is slightly conical in the illustrated arrangement to facilitate its association with the valve base 10 of an existing type and having a conical valve seat 20, the valve seat 30 being tapered to conform to the shape of the existing valve seat 20 for mechanical purposes. It has been found that if the valve seat 30 is caused to converge at a more rapid rate, the dimensioning of the parts and the accuracy of the limit-stop engagement between shoulder 96 and the upper edge of portion 78 of the diaphragm 72 tend to become more critical. Further, the more nearly horizontal the portion valve seat 30 is, the greater the likelihood that sediment will collect thereon. Accordingly, a cylindrical or but gently converging valve seat 30 is preferred.

It will be recognized that since the diaphragm 88 is elastic and stretches and contracts during rolling, any sediment or other such particles which adhere momentarily to the surface thereof will tend to be thrown off due to this flexing action.

The relationship between the area of the fluid in-flow port, which is the area between the lip 36 and the diaphragm 72 when the valve is open (FIGURE 4) and which is covered by the curtain portion 86 when the valve is closed (FIGURE 3) and the throat area of the valve seat 30 tends to control the point in the fall of the water level in the tank at which the valve closes, and therefore tends to control the amount of post-flushing water flow and hence the water level in the bowl. In the constructed embodiment of the invention, the annular in-flow area was selected to be larger than the throat area of the valve seat 30, the former being about 4 square inches and the latter being about 3 square inches.

It will be observed that the particular actuating means disclosed in connection with the arrangement of FIGURES 1 through 4 is but representative. For example, by using a rigid actuator, the rate and extent of the outflow of the fluid from the tank could be controlled, or the same result could be achieved with a flexible actuator by adequately increasing the weight of the inner member. It will also be observed that the unit can be adapted to serve as a check valve to permit reverse flows but to prevent forward flows, with the magnitude of the reverse-flow pressure differential which is required to open the valve being controlled by the weight of the valve, or, if desired, by a biasing spring.

The valve assembly illustrated in FIGURES 1 through 4 seals in response to fluid pressure but is actuated under manual control. Certain of the principles of the present invention may be applied to a unit in which the actuation is accomplished otherwise, such as in response to the pressure of the fluid. For example, two forms of fluid pressure regulating devices are illustrated in FIGURES 6 and 7 of the drawings.

Figure 7:
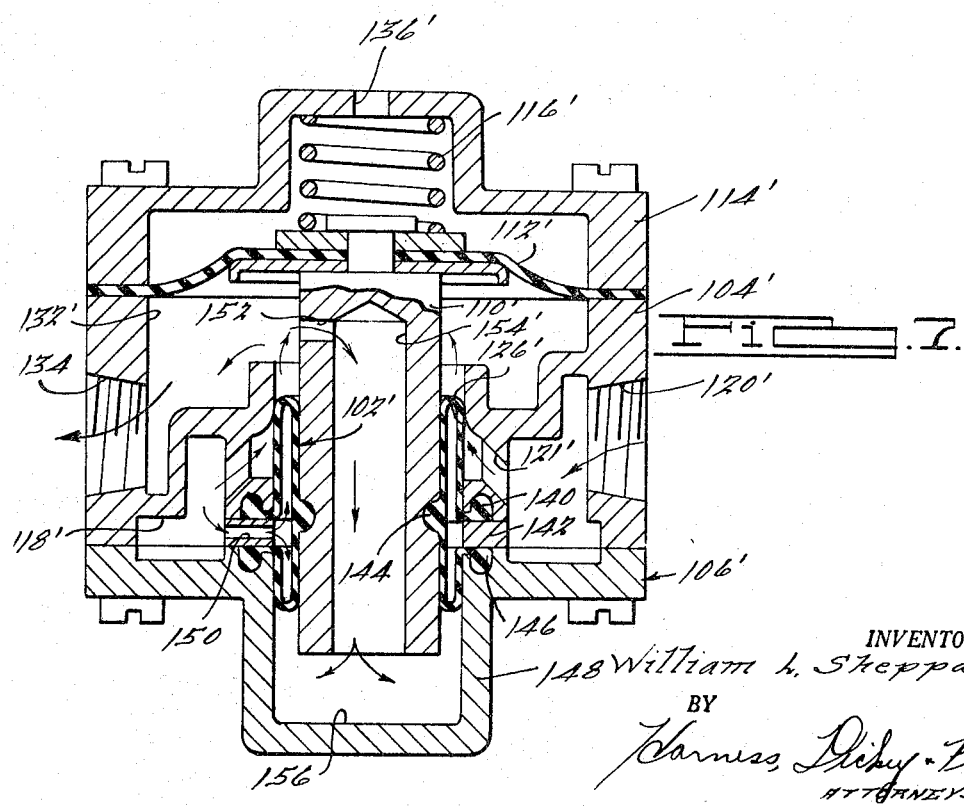
FIGURE 7 is a longitudinal sectional view of a still further modification.

In the regulator illustrated in FIGURE 6 of the drawings, the peripheral lip 100 of the diaphragm 102 is sealingly clamped between a valve body 104 and a cap 106. The central portion 108 of the diagram 102 is seated upon the end of an inner or piston member 110 the other end of which is secured to the central portion of a flexible diaphragm 112 the periphery of which is clamped between the valve body 104 and an end cap 114. A biasing spring 116, which sets the regulated pressure, is anchored against the cap 114 and exerts a force tending to move the piston member 110 downwardly, in the view of FIGURE 5. The line-pressure fluid is supplied to an annular chamber 118 in the valve body 104 through a port 120. This fluid pressure in chamber 118 is applied through a plurality of ports including ports 120 and 122 against the curtain portion 124 of the diaphragm 102. The pressure in chamber 118 is also applied through a port or orifice 128 to the under or reverse surface of diaphragm 102. As a consequence, the pressure applied to curtain area 124 of diaphragm 102 is balanced, but that fluid pressure exerts a force tending to retain the sealing area of the diaphragm 102 tightly in engagement with the valve seat 126, formed integrally with body 104, and to maintain the diaphragm 102 in engagement with the piston member 110. If desired, port 128 may represent a restriction in order to dampen any tendency for the unit to oscillate during regulation.

When the valve opens, the fluid flows past the valve seat and through an output flow port 130 (defined by valve seat 126) into a chamber 132 which is connected via a port 134 to the load device. The regulated pressure in chamber 132 is applied against the upper surface of the lobe of the diaphragm 102 as well as against the undersurface of the diagram 112, the upper surface of which is exposed to atmospheric pressure via an opening 136 in the cap 114.

The valving arrangement operates similarly to that above described except that the piston member 110 is actuated under the control the pressure sensing diaphragm 112 rather than manually.

The regulator of FIGURE 6 is not a fully balanced structure and accordingly, some variation in the output pressure will be experienced in response to variations of the input pressure. Balancing to reduce or eliminate variation can be accomplished, as an example, in the manner illustrated in FIGURE 7 of the drawings.

In the arrangement of FIGURE 7, the inner or piston member 110' is actuated under the control of the diaphragm 112', the undersurface of which is responsive to the regulated pressure in chamber 132' and the upper surface of which is subjected to atmospheric pressure, but the diaphragm 102' and porting arrangement is somewhat different than that disclosed in FIGURE 6. In the balanced arrangement, diaphragm 102' has a first peripheral lip 140 which is clamped between the valve body 104' and a spacer 142. The central portion 144 of the diaphragm 102', which is beaded, is inserted in an annular groove in the piston member 110'. Between the portion 144 and the first peripheral lip 140 is an intermediate portion which projects along the piston 110', reverses on itself to form a lobe, and extends as a curtain portion to the peripheral portion 140. The curtain portion serves to block the flow of fluid through the port 120' and the sealing portion of the diaphragm between the curtain portion and the lobe engages a valve seat 126'. The diaphragm 102' is further provided with a second peripheral bead 146 which is clamped between the spacer 142 and the cover or plate 106', and the portion of the diaphragm intermediate the central portion 144 and the peripheral lip 146 is looped to form a lobe between the piston 110' and the cylindrical extension 148 of the plate 106'. The line pressure in annular chamber 118' is admitted through one or more ports or orifices 150 formed in the spacer 142 into the interior cavity of the diaphragm 102' so as to balance the forces on the curtain portion of the diaphragm, so as to force the diaphragm 102' tightly into engagement with the valve seat 126', and so as to hold the diaphragm in tight sealing engagement both with the piston member 110' and with the wall of the extension 148 of the plate 106'. The regulated pressure appearing in chamber 132' is admitted through one or more ports or orifices 152 in the piston member 110' to a bore 154 formed in that piston and hence is applied to a chamber 156 defined by the extension 148 of the plate 106'. Consequently, this regulated pressure is applied against the lower lobe of the diaphragm 102'. In this structure, the effective area of the diaphragm 102' is subjected at both lobes to the regulated pressure so that the forces on diaphragm 102' produced by that pressure are balanced and accordingly, the regulated pressure in chamber 132' is determined solely by the area of diaphragm 112' and the magnitude of the spring 116' and variations in the input pressure will not be reflected as variations in the output pressure.

In each of the embodiments, an inner member is movable axially with respect to an outer member. It will be appreciated that those relationships may be reversed. Further, the expression axial movement is intended to be generic to movements which deviate from true axial movement by less than the limits of lateral displacement established by the flexible diaphragm, such as an arcuate movement of sufficient radius. It will be appreciated that certain of the principles of the present invention can be applied both to pneumatic valves and hydraulic valves as well as to combinations thereof, and the term fluid is intended to be generic.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A flush valve assembly for a water-closet tank for controlling the flow of water from the tank in which it is immersed into the water-closet bowl comprising inner and outer members axially movable with respect to one another between lower and upper positions, a fluid inflow port for communication with a water-closet tank, a valve seat fixed with respect to one of said members and defining a fluid out-flow port for communication with a water-closet bowl, and a flexible diaphragm effectively impervious to the fluid and having a central portion fixed to said inner member, a peripheral portion fixed to said outer member, and an intermediate portion forcefully engageable with said valve seat in said lower one of said positions of said members in response to water pressure for preventing fluid flow from said in-flow port out said out-flow port and separable from said valve seat in said upper one of said positions of said members for permitting fluid flow from said in-flow port out said out-flow port, said inner member being buoyant in the water, a lower portion of said inner member being isolated from the water when said inner member is in said lower position and upper portion of said inner member being subjected to the pressure of the water for creating a pressure differential across said inner member exerting a downward force on said inner member greater than the upward force produced by the buoyancy of said member, and manually actuable means for selectively lifting said inner member to reduce said pressure differential and permit said inner member to be effectively buoyed by the water.

2. The combination of claim 1 in which said central portion of said flexible diaphragm sealingly engages said inner member for preventing the flow of water between said inner member and said central portion.

3. The combination of claim 1 in which said intermediate portion of said flexible diaphragm is reversed on itself to define a rolling lobe.

4. The combination of claim 1 in which said intermediate portion of said flexible diaphragm is reversed on itself to define a rolling lobe having inner and outer wall portions, one of which is engageable with said valve seat.

5. The combination of claim 4 in which said inner member has a portion disposed within said valve seat at least while said members are in said one of said positions, and in which said inner wall portion is engageable with said portion of said inner member and in which said outer wall portion is engageable with said valve seat.

6. The combination of claim 4 in which the pressure of fluid acts against said intermediate portion to force said one of said wall portions into sealing engagement with said valve seat while said members are in said one of said positions.

7. The combination of claim 4 in which said valve seat is of substantial width and in which an area of substantial width on said one of said wall portions is engageable with said valve seat.

8. The combination of claim 7 in which said flexible diaphragm is unrolled into engagement with said valve seat with successive increments of the width of said area on said one of said wall portions successively engaging corresponding increments of said valve seat.

9. A valve for controlling a controlled fluid comprising an outer member; an inner member movable with respect to said outer member between two positions; a fluid in-flow port; a valve seat fixed with respect to said outer member and defining a fluid out-flow port; flexible diaphragm means effectively impervious to the fluid and having a central portion affixed to said inner member, a first peripheral portion fixed to said outer member, a first intermediate portion forcefully engageable with said valve seat in one of said positions of said inner members in response to the pressure of the controlled fluid for preventing fluid flow from said in-flow port out said out-flow port and separable from said valve seat in the other one of said positions of said inner member for permitting fluid flow from said in-flow port out said out-flow port, a second peripheral portion fixed to said outer member and a second intermediate portion extending between said inner and outer members and spaced from said first intermediate portion to define a cavity therebetween; means for introducing the controlled fluid to said cavity; means for connecting the outlet side of said fluid out-flow port to both said first and second intermediate portions on the opposite side thereof from said cavity; and means for shifting the position of one of said members relative to each other comprising a separate diaphragm having a portion connected to said inner member and a portion connected to said outer member and responsive to the pressure of the controlled fluid on said outlet side of said out-flow port acting on said inner member and on a portion of said flexible diaphragm when said inner member is in said one position for exerting a force tending to hold said inner member in said one of said positions.

10. A regulating valve for controlling a controlled fluid comprising an inner member axially movable with respect to an outer member between two positions; a fluid in-flow port; a valve seat fixed with respect to said outer member and defining a fluid out-flow port; a flexible diaphragm effectively impervious to the fluid and having a central portion fixed to said inner member, a peripheral portion fixed to said outer member, and an intermediate portion forcefully engageable with said valve seat in one of said positions of said members in response to the pressure of the controlled fluid for preventing fluid flow from said in-flow port out said out-flow port and separable from said valve seat in the other one of said positions of said members for permitting fluid flow from said in-flow port out said out-flow port; means for exposing one face of said diaphragm and inner member to fluid at the pressure of the fluid at said in-flow port for exerting a first force on said inner member tending to move said inner member towards said position in which said intermediate portion is in engagement with said valve seat, and means including second diaphragm means responsive to the difference between the pressure of the fluid beyond said out-flow port and a reference pressure for exerting a force on said inner member tending to move said inner member towards said other position which increases with decreases of said pressure of the fluid beyond said out-flow port.

11. The combination of claim 10 in which said flexible diaphragm further includes an additional peripheral portion fixed to said outermember, and an additional intermediate portion extending between said inner and outer members and spaced from the first intermediate portion to define a cavity therebetween, and means for introducing the controlled fluid to said cavity, means for connecting the outlet side of said fluid out-flow port to said additional intermediate portion on the opposite side thereof from said cavity for developing a force opposing said first force.

12. The combination of claim 10 further including spring means for exerting a preselected force tending to move said inner member relative to the outer member.

13. A fluid-controlling valve comprising inner and outer members axially movably with respect to one another between two positions; a fluid in-flow port; a valve seat fixed with respect to one of said members and defining a fluid out-flow port; and a unitary flexible diaphragm effectively impervious to the fluid and having a central portion fixed to said inner member, a first peripheral portion fixed to said outer member, a second peripheral portion fixed to said outer member, a first intermediate portion between said central portion and said first peripheral portion and projecting in one direction between said members, and a second intermediate portion between said central portion and said second peripheral portion projecting in the opposite direction between said members, said second intermediate portion being forcibly engageable with said valve seat in one of said positions of said members in response to the pressure of the fluid for preventing fluid flow from said in-flow port out said out-flow port and separable from said valve seat in the other one of said positions of said members for permitting fluid flow from said in-flow port out said out-flow port, means for applying the in-flow fluid pressure to a first outer surface portion of said second intermediate portion and to an inner surface portion of both said first and said second intermediate portions, and means for applying the out-flow fluid pressure to an outer surface portion of said second intermediate portion different from said first outer surface portion and to a corresponding outer surface portion of said first intermediate portion.

14. The combination of claim 13 further including means for shifting the position of one of said members relative to the other.

15. The combination of claim 14 in which said means for shifting the position of one of said members relative to the other comprises a second diaphragm extending between said members and responsive to the difference between the out-flow fluid pressure and a reference pressure.

16. In a flush valve assembly for association with an existing valve base in a closet tank in lieu of an existing ball valve, the combination of a generally tubular valve seat member seatable on the existing valve base, a float coaxial with said valve seat and movable axially with respect thereto, a flexible diaphragm interjoining said valve seat and said float, and means for securing said valve seat member to the valve base.

17. The combination of claim 16 further including a fluid seal disposed between said valve seat member and the valve base.

18. In a replacement assembly for association with an existing valve base and overflow pipe assembly in a closet tank, the combination of a valve seat member seatable on the existing valve base, and means for securing said valve seat member to the valve base comprising clamp means engaging said valve seat member and the overflow pipe.

19. In a flush valve assembly for association with an existing valve base and overflow pipe assembly in a closet tank in lieu of an existing ball valve, the combination of a valve seat member seatable on the existing valve base, a float coaxial with said valve seat and movable axially with respect thereto, and means for securing said valve seat member to the valve base comprising clamp means engaging said valve seat member and the overflow pipe.

20. In a flush valve assembly for association with an existing valve base and overflow pipe assembly in a closet tank in lieu of an existing ball valve, the combination of a generally tubular valve seat member seatable on the existing valve base, a float coaxial with said valve seat and movable axially with respect thereto, and means for securing said valve seat member to the valve base comprising clamp means engaging said valve seat member and the overflow pipe, said clamp means including an apertured portion accepting and engaging the overflow pipe.

21. In a flush valve assembly for association with an existing valve base and overflow pipe assembly in a closet tank in lieu of an existing ball valve, the combination of a generally tubular valve seat member seatable on the existing valve base, a float coaxial with said valve seat and movable axially with respect thereto, and means for securing said valve seat member to the valve base comprising clamp means engaging said valve seat member and the overflow pipe, said clamp means including a first portion having an aperture larger in size than the overflow pipe and freely accepting the overflow pipe, and a second portion spaced from said first portion and having a bearing wall spaced in an axial direction from said first portion and engageable with the overflow pipe.

22. The combination of claim 21 in which the radial distance between said bearing wall and the diametrically opposite wall of said aperture is substantially equal to the diameter of the overflow pipe.

23. In a flush valve assembly for association with an existing valve base and overflow pipe assembly in a closet tank in lieu of an existing ball valve, the combination of a generally tubular valve seat member seatable on the existing valve base, a float coaxial with said valve seat and movable axially with respect thereto, a flexible diaphragm interjoining said valve seat and said float and engageable with said valve seat and serving as a valve, and means for securing said valve seat member to the valve base comprising clamp means engaging said valve seat member and the overflow pipe, said clamp means including an apertured portion accepting and engaging the overflow pipe.

24. In a flush valve assembly for association with an existing valve base and overflow pipe assembly in a closet tank in lieu of an existing ball valve for controlling a controlled liquid, the combination of a liquid in-flow port, a generally tubular valve seat seatable on the existing valve base and defining a fluid out-flow port, a float member coaxial with said valve seat and movable axially with respect thereto, an outer member fixed with respect to said valve seat, a flexible diaphragm interjoining said valve seat and said float engageable with said valve seat and serving as a valve and being effectively impervious to the liquid and having a central portion fixed to said float, a peripheral portion fixed with respect to said outer member, and an intermediate portion forcefully engageable with said valve seat in one of said positions of said members in response to the pressure of the controlled liquid for preventing liquid flow from said in-flow port out of said out-flow port and separable from said valve seat from the other one of said positions of said members for permitting liquid flow from said in-flow port out said out-flow port, and means for securing said valve seat member to the valve base comprising clamp means engaging said valve seat member and the overflow member, said clamp means including an apertured portion accepting and engaging the overflow pipe.

References Cited by the Examiner
UNITED STATES PATENTS

| | | | |
|---|---|---|---|
| 229,695 | 7/1880 | Granger | 251—335.1 X |
| 1,793,396 | 2/1931 | Haentjens | 251—331 X |
| 2,537,308 | 1/1951 | Hansen | 251—331 |
| 2,557,536 | 6/1951 | Drane et al. | 137—525 X |
| 2,720,378 | 10/1955 | Otto | 251—61 |
| 2,723,678 | 11/1955 | Wilson | 137—525 X |
| 2,781,051 | 2/1957 | Hawley | 251—335 X |
| 2,875,977 | 3/1959 | Stone et al. | 251—331 |
| 2,885,180 | 5/1959 | Zinkil | 251—331 |
| 2,955,616 | 10/1960 | Tarrett et al. | 251—331 X |
| 2,964,758 | 12/1960 | Graziosi | 4—57 |
| 2,971,202 | 2/1961 | Brewington | 4—57 |
| 2,976,542 | 3/1961 | Brewington | 4—57 |
| 3,070,108 | 2/1962 | Fischer | 137—505.18 X |

WILLIAM F. O'DEA, *Primary Examiner.*

M. CARY NELSON, ISADOR WEIL, *Examiners.*

D. ROWE, H. WEAKLEY, *Assistant Examiners.*